US007099690B2

(12) United States Patent
Milosavljevic

(10) Patent No.: US 7,099,690 B2
(45) Date of Patent: Aug. 29, 2006

(54) ADJUSTABLE MULTI-BAND ANTENNA

(75) Inventor: Zlatoljub Milosavljevic, Oulu (FI)

(73) Assignee: LK Products Oy, Kempele (FI)

(*) Notice: Subject to any disclaimer, the term of this patent is extended or adjusted under 35 U.S.C. 154(b) by 369 days.

(21) Appl. No.: 10/807,027

(22) Filed: Mar. 22, 2004

(65) Prior Publication Data

US 2004/0207559 A1 Oct. 21, 2004

(30) Foreign Application Priority Data

Apr. 15, 2003 (FI) ................................ 20030565

(51) Int. Cl.
*H04B 1/38* (2006.01)
*H04M 1/00* (2006.01)
*H01Q 1/24* (2006.01)

(52) U.S. Cl. .............................. 455/552.1; 455/575.7; 343/702

(58) Field of Classification Search ............. 455/550.1, 455/552.1, 575.7, 129, 269; 343/702, 893
See application file for complete search history.

(56) References Cited

U.S. PATENT DOCUMENTS

| | | | | |
|---|---|---|---|---|
| 5,585,810 | A | 12/1996 | Tsuru et al. | |
| 6,862,441 | B1 * | 3/2005 | Ella | 455/307 |
| 2003/0137463 | A1 | 7/2003 | Shimizu | |
| 2004/0217914 | A1 * | 11/2004 | Yamashita et al. | 343/850 |

FOREIGN PATENT DOCUMENTS

| | | | |
|---|---|---|---|
| EP | 1 052 723 | A2 | 11/2000 |
| EP | 1 113 524 | A2 | 7/2001 |
| WO | WO-02/067375 | A1 | 8/2002 |
| WO | WO-02/067379 | A1 | 8/2002 |
| WO | WO-02/078124 | A1 | 10/2002 |

* cited by examiner

*Primary Examiner*—Nguyen T. Vo
(74) *Attorney, Agent, or Firm*—Darby & Darby

(57) ABSTRACT

An adjustable multi-band planar antenna especially applicable in mobile terminals. In the structure of the antenna, advantageously on a surface of a dielectric part, there is placed a conductive element (430) having a significant electromagnetic coupling to the radiating plane (422). The arrangement further comprises a filter (440) and a switch (SW) so that the parasitic conductive element at issue can be connected through the filter to a terminal element (TE) connected to the ground plane. That terminal element is pure short-circuit or a reactive element. An antenna's operation band, which is desired to be displaced, situates on pass band of the filter, and another operation band, which is desired not to be effected, situates in stop band of the filter. Controlling the switch causes the electric length of the antenna's part corresponding for example the upper operation band to change measured from the short-circuit point, in which case also the resonance frequency changes and the band is displaced. Only one operation band of the antenna is affected because on the other operation bands a high impedance is "seen" from the parasitic element towards the ground, although the switch is closed.

9 Claims, 5 Drawing Sheets

ADJUSTABLE MULTI-BAND ANTENNA

The invention relates to an adjustable multi-band planar antenna especially applicable in mobile terminals. The invention further relates to a radio device equipped with that kind of antenna.

BACKGROUND OF THE INVENTION

The adjustability of an antenna means in this description, that a resonance frequency or frequencies of the antenna can be changed electrically. The aim is that the operation band of the antenna round a resonance frequency always covers the frequency range, which the function presumes at a given time. There are different grounds for the adjustability. As portable radio devices, like mobile terminals, are becoming smaller thickness-wise, too, the distance between the radiating plane and the ground plane of an internal planar antenna unavoidably becomes shorter. A drawback of the reducing of said distance is that the bandwidths of the antenna are becoming smaller. Then, as a mobile terminal is designed to function according to different radio systems having frequency ranges relatively close to each other, it becomes more difficult or impossible to cover said frequency ranges used by more than one radio system. Such a system pair is for instance GSM1800 (Global System for Mobile telecommunications) and GSM1900. Correspondingly, securing the function that conforms to specifications in both transmitting and receiving bands of a single system can become more difficult. When the system uses sub-band division, it is advantageous if the resonance frequency of the antenna can be tuned inside sub-band being used at a given time, from the point of the radio connection quality.

According to the invention described here the adjustment of an antenna is performed by a switch. Using switches for that purpose is well known as such. The patent publication U.S. Pat. No. 6,255,994 discloses a PIFA-like antenna (Planar Inverted F-Antenna) having two short-circuit conductors between the radiating plane and ground plane. The first short-circuit conductor can be connected to the ground plane through a reactive element or directly by means of a two-way switch. The second short-circuit conductor can be connected to the ground plane or can be left unconnected by means of a closing switch. One of three alternative places can be selected for the operation band by controlling the switches. A drawback of this solution is that it is designed only for a one-band antenna. Moreover the structure comprises, compared with an usual PIFA, an additive short-circuit conductor with it's arrangements, resulting to extra manufacturing cost of the antenna.

A solution presented in FIGS. 1*a*, 1*b*, 2 and 3 is known from the application publication FI 20021555. The basis of the solution is that a parasitic conductive element is connected to the ground. In FIG. 1*a* there is antenna 100, the radiating plane 120 of which is a conductive layer on the surface of a small antenna circuit board 105. The antenna circuit board is supported above the radio device's circuit board 101 by dielectric pieces 181, 182. The upper surface of the circuit board 101 is mostly conductive functioning as the ground plane 110 of the antenna and at the same time as the signal ground GND. To the radiating plane 120 is joined the antenna's short-circuit conductor 111 at the short point S and the feed conductor 112 at the feed point F. The antenna then is PIFA. It is a dual-band antenna having a lower and an upper operation band. From an edge of the radiating plane, beside the short point, starts it's first slot 125, by means of which the electric length of the radiating plane is arranged to be consistent with the lower operation band. The upper operation band is formed by a radiating second slot 126. The radiating slot 126 starts from an edge of the plane 120 and travels between the feed point and the short point.

On the lower surface of the antenna circuit board 105 there is, drawn by a broken line in FIG. 1*a*, a conductive strip 130. This is located on the opposite side of the rectangular circuit board 105 compared with the side, on which the open ends of the first and second slots are. The conductive strip 130 is below the radiating conductive surface, extending below the closed end of the radiating slot 126. The area of the conductive strip is so large that it has a significant electromagnetic coupling to the radiating plane 120. The conductive strip then is a parasitic element in the antenna. The conductive strip 130 is connected by a conductor to the first terminal of the switch SW, located on the circuit board 101 of the radio device. The second terminal of the switch SW is connected directly to the ground plane. The terminals of the switch can be connected to each other and separated from each other by a control signal CO. As the first terminal is connected to the second terminal, i.e. the switch is closed, the conductive strip is connected to the ground plane. In that case the conductive strip causes additional capacitance in the resonator based on the second slot 126, in the closed end of the resonator where magnetic field prevails. That results in the electric length of the slot radiator shortening and the resonance frequency rising. With respect to the radiating conductive element it goes on the contrary: It's electrical length increases and resonance frequency lowers, when the switch SW is closed.

FIG. 1*b* presents the antenna circuit board 105, seen underneath. The conductive strip 130 is now seen on the surface of the antenna circuit board. The slots 125, 126 of the radiating plane are drawn by broken lines. The switch SW and the signal ground are presented by graphic symbols.

In FIG. 2, too, there is a dual-band PIFA. It's basic structure differs from the structure shown in FIG. 1*a* so that both operation bands are based on conductive radiators. For this reason the radiating plane 220 has a slot 225, which starts from an edge of the plane next to the short point S and ends up at inner region of the plane. The slot 225 has such a shape that the radiating plane, viewed from the short point, is split into two branches. The first branch 221 skirts along edges of the plane and surrounds the second, shorter branch 222. The first branch together with the ground plane resonates in the lower operation band of the antenna and the second branch together with the ground plane in the upper operation band. The radiating plane 220 is a fairly rigid conductive plate, or metal sheet, being supported by a dielectric frame 280 to the radio device's circuit board 201 below the radiating plane. The conductive upper surface of the circuit board 201 functions as the ground plane 210 of the antenna and at the same time as the signal ground GND, as in FIG. 1*a*. The short-circuit conductor 211 and the feed conductor 212 are spring contact type and the one and the same piece with the radiating plane.

In FIG. 2 a parasitic conductive strip 230 is attached or otherwise provided on a vertical outer surface of a dielectric frame 250, on that side of the antenna, where the feed conductor and the short-circuit conductor are located. The conductive strip 230 is in that case below the electrically outermost portion of the first branch 221, for which reason the connection of the conductive strip effects more strongly on the place of the antenna's lower operation band than on the place of the upper operation band. The switching arrangement in FIG. 2 is shown only by graphic symbols. The parasitic element 230 is connected to a switch SW, the second terminal of which is connected to the signal ground, instead a pure conductor, through a structure part having impedance X. The impedance can be utilized, if desired displacements of operation bands can not be obtained merely by selecting the place of the parasitic element. The impedance X is reactive, either purely inductive or purely capacitive; a resistive part is out of the question due to dissipations caused by it.

FIG. 3 shows an example of the effect of the parasitic element on antenna's operation bands in structures as described above. The operation bands appear from curves of the reflection coefficient S11 of the antenna. Curve 31 shows alteration of the reflection coefficient as a function of frequency, when the parasitic conductive strip is not connected to the ground, and curve 32 shows alteration of the reflection coefficient as a function of frequency, when the conductive strip is connected to the ground. When comparing the curves, it will be seen that the lower operation band is shifted downwards and the upper operation band upwards in the frequency axis. The frequency $f_1$, or the mid frequency of the lower band for a start, is for instance 900 MHz and it's displacement $\Delta f_1$ is for instance −20 MHz. The frequency $f_2$, or the centre frequency of the upper band for a start, is for instance 1,73 GHz and it's displacement $\Delta f_2$ is for instance +70 MHz.

In the structures such as shown in FIGS. 1*a* and 2, the adjusting of a multi-band antenna is obtained by means of small additive components, which do not presume changes in the antenna's basic structure. The parasitic element is placed on a surface of a dielectric part, which is needed in the antenna structure in any case. The effect of the parasitic element can be directed, for example in dual-band antennas, to the lower and upper operation band, or as well only to the lower operation band. However a drawback is that directing the effect only to the higher operation band is not successful in the practice. Also the lower operation band is displaced, although that is tried to be avoided. The above-described FIG. 3 actually represents just such a case. Another drawback is increasing of dissipations of signals in the lower band so that the antenna's efficiency in the lower band decreases e.g. from 0.5 to 0.4.

SUMMARY OF THE INVENTION

An object of the invention is to alleviate the above-mentioned drawbacks associated with the prior art. An adjustable multi-band antenna according to the invention is characterized in that which is specified in the independent claim 1. A radio device according to the invention is characterized in that which is specified in the independent claim 9. Some advantageous embodiments of the invention are presented in the dependent claims.

The basic idea of the invention is as follows: In the structure of an antenna of PIFA type, advantageously on a surface of a dielectric part, there is placed a conductive element having a significant electromagnetic coupling to the radiating plane. The arrangement further comprises a filter and a switch so that the parasitic conductive element at issue can be connected through the filter to a terminal element connected to the ground plane. That terminal element is pure short-circuit or a reactive element. An antenna's operation band, which is desired to be displaced, situates in pass band of the filter, and another operation band, which is desired not to be effected, situates in stop band of the filter. Controlling the switch causes the electric length, measured from the short point, of the antenna's part corresponding for example the upper operation band is changed, in which case also the resonance frequency changes and the band is displaced.

An advantage of the invention is that by controlling the switch only one operation band of the antenna is affected. This is due to that concerning other operation bands, because of the filter, a high impedance is seen from the parasitic element towards the ground it is "seen" a high impedance, although the switch would be closed. Another advantage of the invention is that closing the switch does not deteriorate the antenna's matching and efficiency in said other operation bands. A further advantage of the invention is that an advantageous place for the parasitic element can be searched more freely than without the filter. A further advantage of the invention is that the adjusting circuit can be designed more freely than without the filter. A further advantage of the invention is that possibility of electro-static discharges (ESD) through the switching circuit is lower.

BRIEF DESCRIPTION OF THE DRAWINGS

The invention is below described in detail. Reference will be made to the accompanying drawings where.

DETAILED DESCRIPTION OF THE INVENTION

Figure 4:
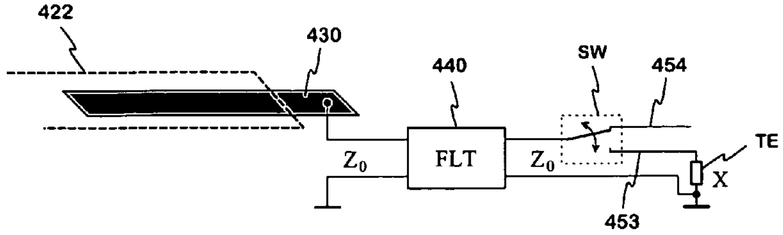
FIG. 4 shows principle of the invention.

FIG. 4 presents a structure showing the principle of the invention. From the antenna's base structure it is drawn only a part 422 of the radiating plane. The antenna's structure comprises, in addition to the base structure, an adjusting circuit having a parasitic element 430, a filter 440, a switch SW and a terminal element TE. The parasitic element has a significant electromagnetic coupling with the radiating plane's part 422 and it is connected through a short transmission line to the input port of the filter 440. The output port of the filter is connected through a second short transmission line to the two-way switch SW, the "hot" terminal of the output port to the first terminal of the switch SW. The first terminal can be connected either to the second or to the third terminal of the switch by controlling the switch. The second terminal is fixedly connected to one conductor 453 of a third short transmission line. In the opposite end of the third transmission line is the terminal element TE, the impedance X of which is reactive. In most common specific case the impedance X is reactance of a zero-inductance, e.g. a pure short-circuit. By using some other, capacitive or inductive reactance, displacement of an operation band can be tuned as desired. The third terminal of the switch is fixedly connected to one conductor 454 of a fourth short transmission line, which is open in the opposite end.

As the two-way switch SW connects the filter to the open transmission line, there is a high impedance from the parasitic element to the ground through the filter and switch at all frequencies, wherein also an impedance provided from the radiating plane to the ground through the parasitic element is high at all frequencies. The arrangement of FIG. 4 has in that case no substantial effect to the antenna's function. As the switch SW connects the filter to the short-circuited transmission line, there is a relatively low reactive impedance from the parasitic element to the ground at the frequencies of the filter's passband. In that case the electric length of the antenna changes and the operation band is correspondingly displaced. At the frequencies of the filter's stopband the impedance from the parasitic element to the ground is relatively high also when the filter is connected to the short-circuited transmission line. In the antenna's operation band, which is located in the stop band, changing of the state of the switch then causes no change in the electric length of the antenna, and in that case the operation band is not displaced.

The characterizing impedance of said transmission lines is marked $Z_0$ in FIG. 4. When needed, in series with the conductor from the switch to terminal element there is a condenser, which prevents direct current circuit through the switch. The condenser has no effect in radio frequencies. In FIG. 4 the switch SW is drawn as a two-way switch, or a SPDT switch (single-pole double through). It can also be just a closing switch or a SPnT switch (single-pole n through) for connecting one of alternative terminal reactances.

Figure 5:
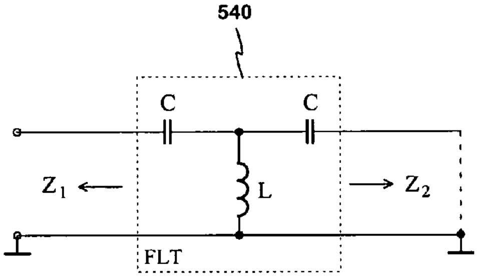
FIG. 5 shows an example of a filter being included in an antenna according to the invention.

FIG. 5 shows an example of a filter to be used in an antenna according to the invention. The filter 540 is a third order passive high-pass filter. Accordingly it has in sequency a first condenser C1, a coil L and a second condenser C2 so that the condensers are in series and the coil L is connected between them to the ground. When the filter is in use, an impedance $Z_1$ affects at it's input towards feeding source, and an impedance $Z_2$ affects at it's output.

A filter according to FIG. 5 is suitable for use in dual-band antenna, the upper operation band of which must be shiftable such that a shift does not effect the lower operation band. The cutoff frequency of the high pass filter is in that case arranged to be between operation bands. If for example the lower operation band is for GSM900 and the upper operation band for both GSM1800 and PCS1900 (Personal Communication Service), a suitable cutoff frequency of the filter is 1.5 GHz. In that case the attenuation in the filter is low in the upper band and high in the lower band. If allowable attenuation in the upper band is for example 0.5 dB, and Chebyshev-approximation is chosen, the attenuation in the lower band will be about 13 dB. If the impedance level is 50 Ω, e.g. the above-mentioned impedances $Z_1$ and $Z_2$ are 50 Ω, a design calculation of the filter results in that the capacitance of both condensers is 1.3 pF and the inductance of the coil is 4.8 nH.

Figure 6:
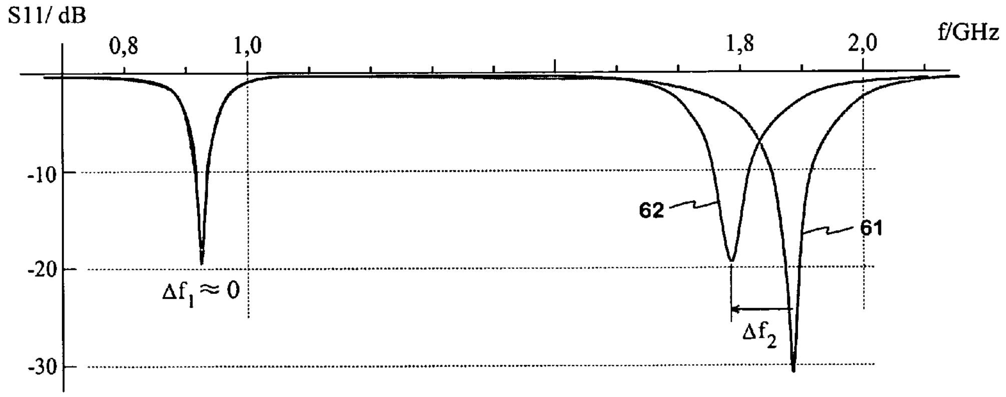
FIG. 6 shows an example of displacement of operation bands of an antenna according to the invention.

FIG. 6 shows an example of displacement of operation bands of an antenna according to the invention. The filter used in the antenna is such as depicted above. Curve 61 shows alteration of the reflection coefficient as a function of frequency when the filter is connected to the open transmission line, and curve 62 shows alteration of the reflection coefficient when the the filter is connected to the short-circuited transmission line. When comparing the curves, it will be seen that the upper operation band, placed in a range of 1.8 GHz, is in this example displaced downwards, when short-circuit is connected. Displacing downwards means that the electric length of the antenna's part at issue has become bigger. This is a consequence of that the impedance provided from the radiating plane to the ground through the parasitic element is capacitive. The displacement $\Delta f_2$ is about 100 MHz. The lower operation band in a range of 900 MHz stays in high accuracy in it's place. Then the aim of the invention is well fulfilled in this respect.

Figure 7:
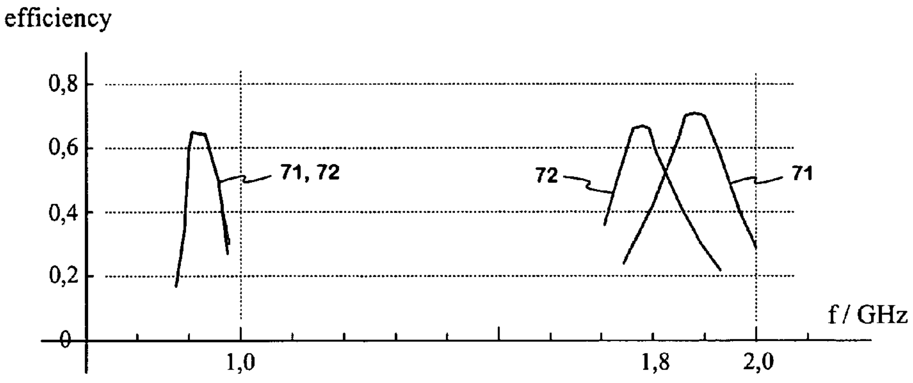
FIG. 7 shows an example of efficiency of an antenna according to the invention, FIGS. 8*a,b* show an example of an adjustable antenna according to the invention.

FIG. 7 shows an example of efficiency of an antenna according to the invention. The example concerns the same structure as matching curves in FIG. 6. Curve 71 shows alteration of the efficiency as a function of frequency when the filter is connected to the open transmission line, and curve 72 shows alteration of the efficiency when the filter is connected to the short-circuited transmission line. When comparing the curves, it will be seen that the efficiency does not deteriorate in the lower operation band, when short-circuit is connected. In the upper operation band, displacing of which is in question, the efficiency is slightly deteriorated.

Figure 8A:
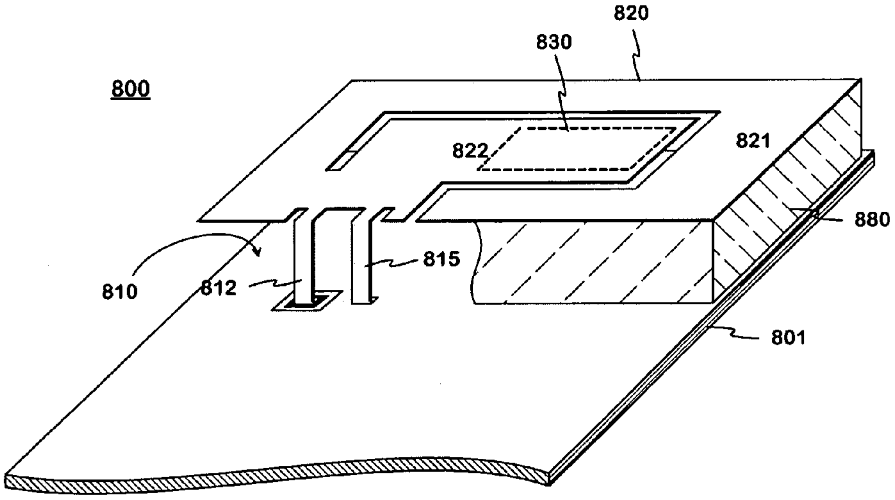
Figure 8B:
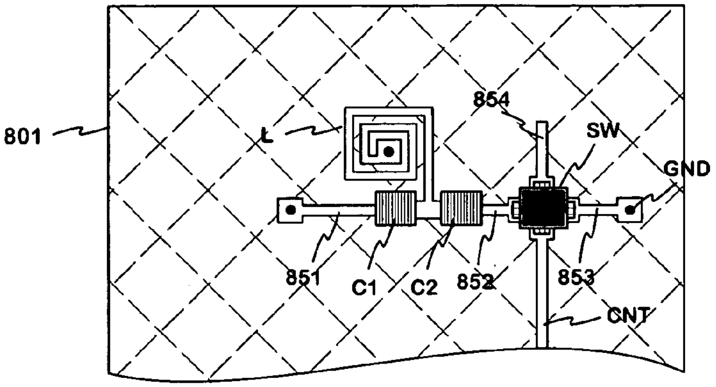

FIGS. 8*a* and 8*b* show an example of an adjustable antenna according to the invention. The base structure of the antenna is similar to the structure in FIG. 2. Strip type parasitic element 830 is now placed under the radiating plane 820, by the second branch 822, which corresponds to the antenna's upper operation band. The parasitic element is connected by a conductor to the filter located on the circuit board 801 of the radio device. The filter is seen in FIG. 8*b*, which shows the circuit board from underneath. The ground plane is then invisible in FIG. 8*b*, on the reverse side of the board. The conductor connected to the parasitic element continues as a strip conductor 851 to the first condenser C1 of the filter. In series with the first condenser is the second condenser C2, and between them the coil L is connected to the ground. In this example C1 and C2 are chip condensers and the coil is realized by a spiral-like strip conductor on the surface of circuit board 801. The second condenser C2 is connected to the first terminal of the switch SW by a strip conductor 852, and the second terminal of the switch is connected to a terminal element by a strip conductor 853, which terminal element in this example is a short-circuit conductor. From the third terminal of the switch starts a strip conductor 854, which is in "air" at it's opposite end. Said strip conductors 851, 852, 853 and 854 form short transmission lines together with the ground plane on the other side of the board, by means of which transmission lines the impedance of the whole adjusting circuit can be tuned. The switch SW is e.g. a semiconductor component or a MEMS type switch (Micro Electro Mechanical System). It is controlled via a strip conductor CNT. If the structure of the switch requires, the number of control conductors is two.

Figure 9:
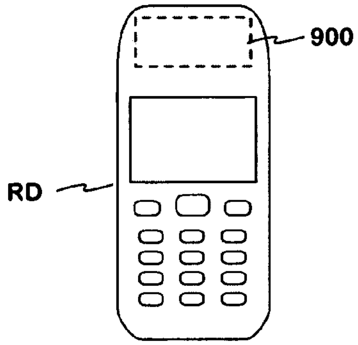
FIG. 9 shows an example of a radio device provided with an antenna according to the invention.

FIG. 9 shows a radio device RD comprising an adjustable multi-band antenna 900 according to the invention.

Figure 1A:
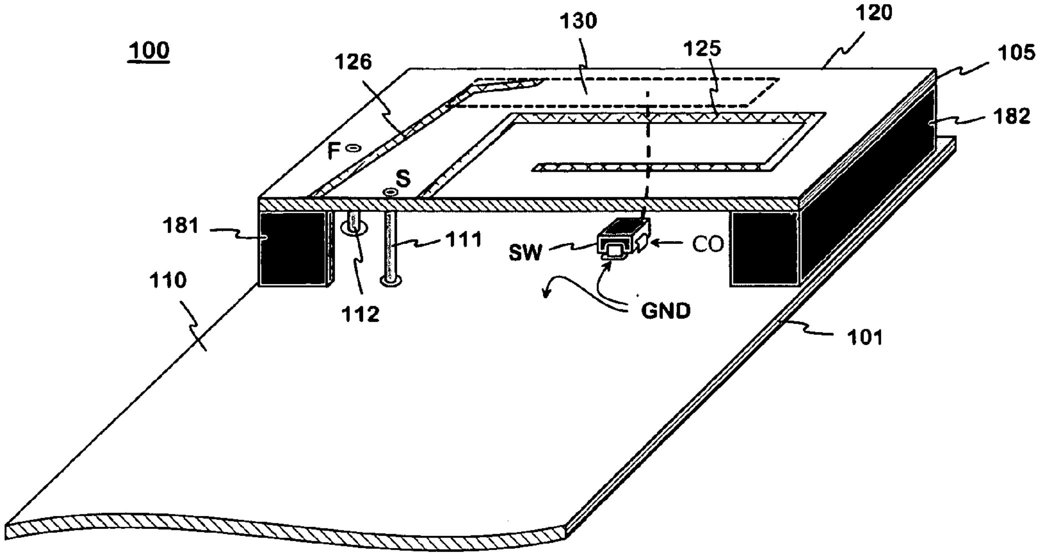
Fig. 1a PRIOR ART
FIG. 1*a* shows an example of an adjustable antenna according to the prior art.
Figure 1B:
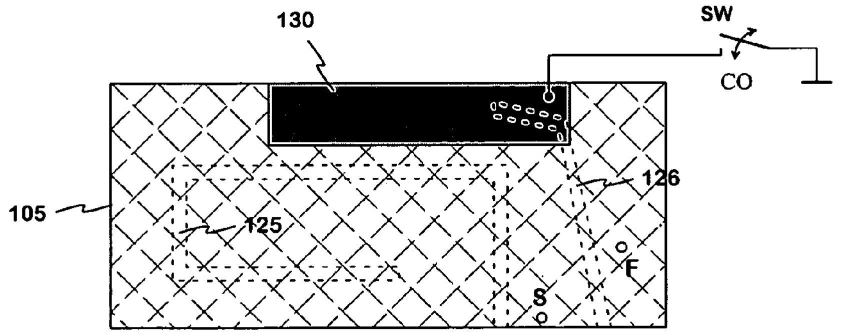
Fig. 1b PRIOR ART
FIG. 1*b* shows the antenna circuit board of the antenna of FIG. 1*a*, seen underneath.
Figure 2:
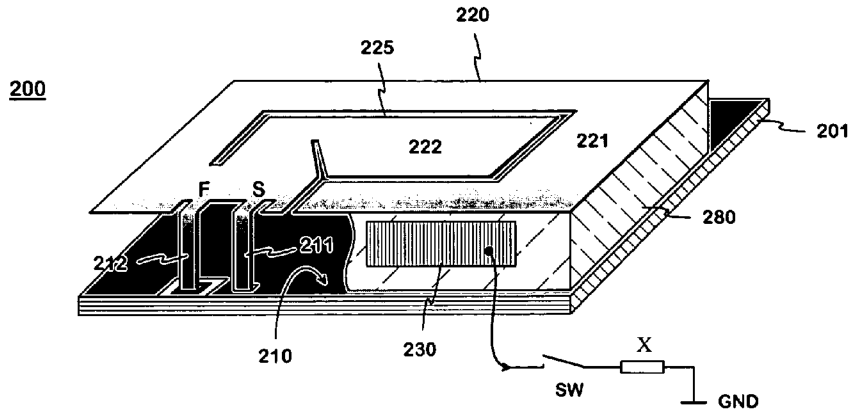
Fig. 2 PRIOR ART
FIG. 2 shows a second example of an adjustable antenna according to the prior art.
Figure 3:
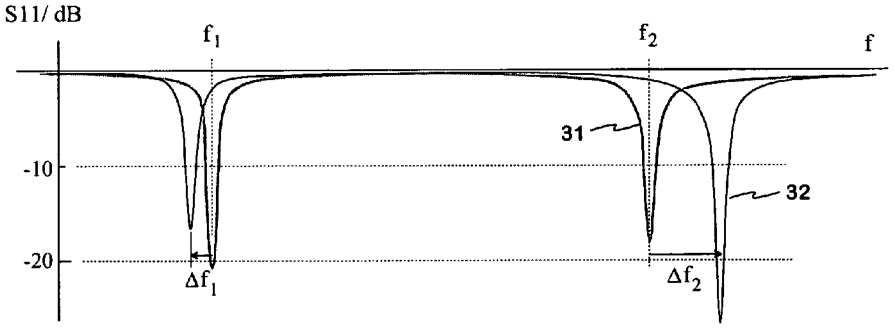
Fig. 3 PRIOR ART
FIG. 3 shows an example of the effect of an arrangement according to the prior art on antenna's operation bands.

Prefixes "lower" and "upper" as well as words "under" and "underneath" refer in this description and in the claims to the antenna positions depicted in the FIGS. 1*a*, 2 and 8*a*, and are not associated with the operating position of the device. The term "parasitic" means also in the claims a structure part, which has a significant electromagnetic coupling to the radiating plane of the antenna.

Above has been described examples of an adjustable multi-band antenna according to the invention. The shape and the place of the parasitic element can naturally vary from that shown in figures. The filter according to the invention can also be a low-pass or bandpass filter. The base structure of the antenna can deviate from those presented in the examples: The amount of radiating elements can be greater than two. A radiating element is not necessary plane-like. The antenna can also be ceramic, in which case also the parasitic element is a part of the conductive coating of the ceramic block. The inventional idea can be applied in different ways within the scope defined by the independent claim 1.

The invention claimed is:

1. An adjustable multi-band antenna having a ground plane, a radiating plane with a dielectric support part, a feed conductor and a short conductor of the antenna, and an adjusting circuit to displace operation band of the antenna, which adjusting circuit comprises a parasitic element and a switch as well as a terminal element directly connected to the ground plane, by which switch the parasitic element can be connected to the terminal element;

the adjusting circuit further comprising, for restricting the effect of controlling the switch to a single operation band of the antenna, a filter located electrically in series with the parasitic element and the switch.

2. An antenna according to claim 1, said single operation band being on passband of the filter and the other operation bands being on stopband of the filter.

3. An antenna according to claim 2, operation bands of which comprise at least a lower operation band and an upper operation band, said single operation band being the upper operation band, and the filter being a high pass filter, the cutoff frequency of which lies between the lower and upper operation bands.

4. An antenna according to claim 1, the filter locating electrically between the parasitic element and the switch so that the parasitic element is connected to filter's input by a conductor of a short transmission line and filter's output is connected to first terminal of the switch by a conductor of second short transmission line, the second terminal of the switch being fixedly connected to one conductor of a third short transmission line, the terminal element being in the opposite end of the third short transmission line.

5. An antenna according to claim 4, the terminal element being a short-circuit conductor.

6. An antenna according to claim 4, the terminal element being a reactive structure part to set a displacement of an operation band as desired.

7. An antenna according to claim 4, the switch being a two-way switch, from third terminal of which starts a conductor of fourth short transmission line, which fourth line is open at it's opposite end.

8. An antenna according to claim 1, said parasitic element being a conductive strip being attached to said dielectric support part.

9. A radio device having an adjustable multi-band antenna, which comprises a ground plane, a radiating plane and an adjusting circuit to displace operation band of the antenna, which adjusting circuit comprises a parasitic element, a switch and a terminal element directly connected to the ground plane, by which switch the parasitic element can be connected to the terminal element;

the adjusting circuit further comprising, for restricting the effect of controlling the switch to a single operation band of the antenna, a filter located electrically in series with the parasitic element and the switch.

* * * * *